UNITED STATES PATENT OFFICE.

JOHN STUCKES, OF ST. LOUIS, MISSOURI.

PROCESS OF MAKING CANDY.

No. 896,596.

Specification of Letters Patent.

Patented Aug. 18, 1908.

Application filed November 26, 1906. Serial No. 345,221.

*To all whom it may concern:*

Be it known that I, JOHN STUCKES, a citizen of the United States, residing at the city of St. Louis, State of Missouri, have invented a certain new and useful Improvement in Processes of Making Candy, of which the following is a full, clear, and exact description, such as will enable others skilled in the art to which it appertains to make and use the same, reference being had to the accompanying drawings, forming part of this specification.

This invention relates to the manufacture of candy known as hard-boiled goods, which is usually marketed in the form of stick candy.

My present invention is designed as an improvement upon the process of making candy described in United States Letters Patent No. 800,511, dated September 26, 1905, and reissued October 9, 1906 as No. 12,540. In my said patent the article produced was composed of a body portion containing a mixture of sugar, glucose, water and a common fat, which body portion was surrounded by an outer shell composed of sugar, glucose and water, the outer shell having a smaller percentage than was contained in the body portion.

In United States Letters Patent No. 800,600 dated September 26, 1905, and reissued November 20, 1906, as No. 12,563, I have described a process of making candy in which the article produced is similar to the one just above described except that the outer shell also had fat in its composition.

I have found that stick candy made in accordance with my aforesaid patents enabled me to use a large percentage of glucose (as high as eighty per cent.), and, furthermore, that such candy could be made in warm weather and withstand dampness without becoming sticky. Candy made in accordance with my aforesaid patents will remain clear and dry for a long period of time and will not become stale or change color.

My present invention is an improvement upon my former processes, and consists in omitting the outer shell or wrapper of the stick candy, which simplifies the working up of the mass into stick form as the spinner has only one mass of candy to handle and manipulate instead of two masses, according to the practice of my aforesaid patents.

I have found that according to my present invention hard-boiled goods and especially stick candy can be made in cool weather without the use of a wrapper and will keep clear and fresh during the continuation of cold weather, but when the temperature rises and the air becomes humid the tendency of candy made according to my present improvement is to mat and stick together. Where paraffin paper is employed to wrap the articles separately, of course this tendency is not objectionable even in warm weather.

According to my present improvement I prefer not to use as high a percentage of glucose as is contemplated in my patents aforesaid, and therefore recommend the following formula for a batch of say one thousand pounds of candy: glucose 450 to 500 lbs.; sugar 500 to 550 lbs.; stearin 15 to 18 lbs. These ingredients may be introduced into the vacuum kettle and boiled together, or the stearin may be added after the candy is made, the stearin being cut into small pieces and worked into the mass of candy on the slab.

Having thus described the invention, what is claimed as new and desired to be secured by Letters Patent is:

The herein described composition of matter for making stick candy and similar hard-boiled goods, consisting of substantially equal parts of glucose and sugar and a comparatively small percentage of stearin; substantially as described.

In testimony whereof I hereunto affix my signature in the presence of two witnesses, this twenty-third day of November, 1906.

JOHN STUCKES.

Witnesses:
 LENOX WILSON,
 GEORGE BAKEWELL.